(12) United States Patent
Siekmann (10) Patent No.: US 11,859,352 B2
(45) Date of Patent: Jan. 2, 2024

(54) ARTIFICIAL TURF INFILL WITH NATURAL FIBER AND RUBBER GRANULATE

(71) Applicant: Melos GmbH, Melle (DE)

(72) Inventor: Jorg Siekmann, Guetersloh (DE)

(73) Assignee: Melos GmbH, Melle (DE)

( * ) Notice: Subject to any disclaimer, the term of this patent is extended or adjusted under 35 U.S.C. 154(b) by 1110 days.

(21) Appl. No.: 16/315,488

(22) PCT Filed: Jul. 21, 2017

(86) PCT No.: PCT/EP2017/068543
§ 371 (c)(1),
(2) Date: Jan. 4, 2019

(87) PCT Pub. No.: WO2018/019734
PCT Pub. Date: Feb. 1, 2018

(65) Prior Publication Data
US 2019/0316303 A1    Oct. 17, 2019

(30) Foreign Application Priority Data

Jul. 27, 2016   (EP) .................... 16181508
Dec. 15, 2016   (EP) .................... 16204500

(51) Int. Cl.
*E01C 13/08* (2006.01)
*C08L 21/00* (2006.01)

(52) U.S. Cl.
CPC ............ *E01C 13/083* (2013.01); *C08L 21/00* (2013.01); *E01C 13/08* (2013.01);
(Continued)

(58) Field of Classification Search
CPC ........ E01C 13/08; E01C 13/083; C08L 21/00; Y10T 428/23921; Y10T 428/2982;
(Continued)

(56) References Cited

U.S. PATENT DOCUMENTS

2002/0048676 A1    4/2002    McDaniel et al.
2008/0299331 A1*  12/2008    Gilardi .................. E01C 13/08
                                                                          428/22
(Continued)

FOREIGN PATENT DOCUMENTS

CN    1432089 A    7/2003
CN    1572974 A    2/2005
(Continued)

OTHER PUBLICATIONS

Author unknown, "Ethylene-Propylene Rubbers & Elastomers," Nov. 1, 2013, (https://web.archive.org/web/20131101082248/http://www.iisrp.com/webpolymers/10epdmsep11.pdf).*
(Continued)

*Primary Examiner* — Cheryl Juska
(74) *Attorney, Agent, or Firm* — Harness, Dickey & Pierce, P.L.C.

(57) ABSTRACT

An artificial turf includes an artificial turf infill. The artificial turf infill includes natural fiber mixed with rubber granulate. The artificial turf infill includes between 10% and 40% of the natural fiber by weight. The natural fiber includes any one of hemp fiber, cotton fiber, burlap fiber, sisal fiber, elephant grass fiber, or combinations thereof.

22 Claims, 7 Drawing Sheets

(52) U.S. Cl.
 CPC .. *D10B 2505/202* (2013.01); *Y10T 428/23921* (2015.04); *Y10T 428/2982* (2015.01); *Y10T 428/2991* (2015.01); *Y10T 428/2998* (2015.01)

(58) Field of Classification Search
 CPC .......... Y10T 428/2991; Y10T 428/2998; D10B 2505/202
 See application file for complete search history.

(56) References Cited

U.S. PATENT DOCUMENTS

| | | | | |
|---|---|---|---|---|
| 2010/0151158 | A1* | 6/2010 | Mashburn | B29B 17/0206 428/17 |
| 2010/0166984 | A1* | 7/2010 | Nusca | B29B 9/12 428/17 |
| 2013/0243976 | A1* | 9/2013 | Lee | C08L 23/16 428/17 |
| 2019/0071546 | A1* | 3/2019 | Sick | B01J 2/006 |

FOREIGN PATENT DOCUMENTS

| | | | |
|---|---|---|---|
| CN | 102549217 | A | 7/2012 |
| EP | 2206833 | A1 | 7/2010 |
| EP | 2189573 | B1 | 5/2013 |
| EP | 3936665 | A1 * | 1/2022 |
| JP | 2014-129647 | A | 7/2014 |
| KR | 101036534 | B1 | 5/2011 |
| KR | 101036534 | B1 * | 5/2011 |
| KR | 101240371 | B1 * | 3/2013 |
| KR | 101240371 | B1 | 3/2013 |
| KR | 101387601 | B1 | 4/2014 |
| KR | 101592143 | B1 | 2/2016 |
| KR | 2016-0040361 | A | 4/2016 |
| KR | 20160040361 | A * | 4/2016 |
| WO | WO-2007010324 | A1 | 1/2007 |

OTHER PUBLICATIONS

EPDM Rubber wikipedia entry, May 17, 2022, https://en.wikipedia.org/wiki/EPDM_rubber.*
KIPRIS translation of KR 101387601, 2014.*
https://www.google.com/search?q=what+is+burlap+fiber&hl=en&ei=TzZYY8-AFLiv5NoP37ybsAl&ved=0ahUKEwiP5M-VjPz6AhW4F1kFHV_eBiYQ4dUDCBA&uact=5&oq=what+is+burlap+fiber&gs_lcp=Cgdnd3Mtd216EAMyBAgAEB4yBggAEAgQHjIFCAAQhgMyBQgAEIYDMgUIABCGAzIFCAAQhgM6CggAEEcQ1gQQsAM6BwguELADEEM6BwgAEIAEEA06CAgAEAgQBxAeOgYIABAeOgYIABAeEA (2022).*
https://burlapfabric.com/faux-burlap (Year: 2022).*
https://www.craftoutlet.com/19-faux-burlap-natural-10-yards (Year: 2022).*
https://www.tableskirtingclip.com/Why-our-Polyester-Faux-Burlap-beats-Jute_b_25.html#:~:text=Softness%3A%20Jute%20is%20a%20fairly%20coarse%20%28rough%29%20fabric.,will%20shed%20and%20produce%20the%20dreaded%20%22Burlap%20lint%22. (Year: 2012).*
"Accelerator" by Ecyclopaedia Britannica, 2021, https://www.britannica.com/technology/accelerator.*
D. Spence, "Catalysts in Vulcanization," The Journal of Industrial and Engineering Chemistry, vol. 10, No. 2, Feb. 1918, https://pubs.acs.org/doi/pdf/10.1021/ie50098a011.*
Examination Report for New Zealand Application No. 749167 dated Jul. 17, 2019.
Office Action for Chinese Application No. 201780042795.4 dated Aug. 5, 2020 and English translation.
Office Action dated Jan. 13, 2020, issued in corresponding Canadian Patent Application No. 3,027,475.
Office Action for Japanese Application No. 2019-501507 dated Mar. 4, 2020 and English translation.
International Search Report PCT/ISA/210 for International Application No. PCT/EP2017/068543 dated Nov. 7, 2017.
Written Opinion of the International Searching Authority PCT/ISA/237 for International Application No. PCT/EP2017/068543 dated Nov. 7, 2017.
International Preliminary Report on Patentability PCT/IPEA/416 for International Application No. PCT/EP2017/068543 dated Oct. 4, 2018.
Office Action for Korean Application No. 10-2019-7000670 dated May 26, 2020 with English translation.

* cited by examiner

ARTIFICIAL TURF INFILL WITH NATURAL FIBER AND RUBBER GRANULATE

CROSS-REFERENCE TO RELATED APPLICATIONS

This application is a national phase under 35 U.S.C. § 371 of PCT International Application No. PCT/EP2017/068543 which has an International filing date of Jul. 21, 2017, which claims priority to European Application Nos. 16204500.9, filed Dec. 15, 2016, and 16181508.9, filed Jul. 27, 2016, the entire contents of each of which are hereby incorporated by reference.

FIELD OF THE INVENTION

The invention relates to artificial turf and methods for the manufacture of artificial turf infill.

BACKGROUND AND RELATED ART

Artificial turf or artificial grass is surface that is made up of fibers which is used to replace grass. The structure of the artificial turf is designed such that the artificial turf has an appearance which resembles grass. Typically artificial turf is used as a surface for sports such as soccer, American football, rugby, tennis, golf, for playing fields, or exercise fields. Furthermore artificial turf is frequently used for landscaping applications.

Artificial turf may be manufactured using techniques for manufacturing carpets. For example artificial turf fibers which have the appearance of grass blades may be tufted or attached to a backing. Often times artificial turf infill is placed between the artificial turf fibers. Artificial turf infill is a granular material that covers the bottom portion of the artificial turf fibers. The use of artificial turf infill may have a number of advantages. For example, artificial turf infill may help the artificial turf fibers stand up straight. Artificial turf infill may also absorb impact from walking or running and provide an experience similar to being on real turf. The artificial turf infill may also help to keep the artificial turf carpet flat and in place by weighting it down.

European Patent EP 2 206 833 A1 discloses a method for producing a particulate infill material for synthetic-grass structures envisages providing a mass of thermoplastic material with a filler consisting of coconut-based material and subjecting said mass of thermoplastic material with the filler consisting of coconut-based material to granulation so as to obtain the aforesaid particulate infill material. Preferentially, the thermoplastic material is in particulate form, and the coconut-based material is in particulate form (fibrous, ground and/or shredded). The mixture obtained by mixing the thermoplastic material and the coconut-based material is preferentially heated in order to bring about softening of the thermoplastic material with the corresponding formation of a matrix of thermoplastic material that incorporates the coconut-based material as filler.

European patent publication EP 2 189 573 B1 discloses an artificial turf structure that has a substrate from which grass-resembling filaments project. At least one filling layer is formed by an infill material is arranged between the filaments. The infill material comprises a coconut based vegetable material in both fibrous form and ground and/or shredded form. This patent publication further discloses that the infill material may additionally comprise both natural fiber and resilient particulate materials such as rubber.

Korean Patent KR 101 387 601 B1 discloses a coating chip for an antistatic artificial tuft filling and a method of manufacturing thereof.

SUMMARY

The invention provides for an artificial turf, a method, and an artificial turf infill in the independent claims. Embodiments are given in the dependent claims.

In one aspect the invention provides for an artificial turf comprising an artificial turf infill. The artificial turf infill comprises natural fiber mixed with rubber granulate. The artificial turf infill comprises between 10% and 40% of the natural fiber by weight. wherein the natural fiber comprises any one of the following: hemp fiber, cotton fiber, burlap fiber, sisal fiber, elephant grass fiber, cellulose fiber, and combinations thereof The use of the natural fiber may be beneficial because the natural is less expensive than the rubber granulate. The use of the natural fiber mixed with the rubber granulate may additionally be advantageous because the natural fiber has a low thermal conductivity and may help prevent the rubber granulate and other components of the artificial turf infill from heating when exposed to sunlight.

Hemp fiber, for example, may be better in this regard than other natural fibers for example coconut husk fibers. Hemp fibers may have a lower thermal conductivity than coconut fibers.

The use of natural fibers, and hemp in particular, may additionally be advantageous over coconut fibers as natural fibers may be less flammable. In some cases the natural fiber may absorb water better than coconut fibers do. The absorption of water by the natural fiber may be advantageous because the artificial turf can be sprayed with water before a game. The evaporation of water from the natural fibers may have a natural cooling effect and may help reduce the temperature of the artificial turf during a game which is played in sunlight.

The use of hemp may also be beneficial because hemp is naturally resistant to fungi in comparison with coconut fibers. Hemp also has the benefit of being very skin friendly. Hemp is less abrasive and/or prickly than many other natural fibers such as wood chips or coconut fibers.

The use of natural fibers, and hemp in particular, as an infill material may also be beneficial because it has superior damping and shock absorption properties. A player who falls on an artificial turf with an infill according to an embodiment may in some cases be less likely to be hurt than if the player fell on an artificial turf that had a predominantly coconut fiber based infill.

In another embodiment the artificial turf infill comprises between 15% and 35% of the natural fiber by weight.

In another embodiment the artificial turf infill comprises between 18% and 22% of the natural fiber by weight.

In another embodiment the artificial turf infill consists of the natural fiber and the rubber granulate.

In another embodiment the artificial turf infill is free of coconut fibers.

In another embodiment the rubber granulate is a vulcanized rubber granulate. The use of the vulcanized rubber granulate may be advantageous because a variety of additives and other properties can be used to modify the rubber granulate.

In another embodiment the vulcanized rubber granulate further comprises a filler material. This may be useful in reducing the cost of using the rubber granulate.

In another embodiment the filler material comprises any one of the following: kaolinite, chalk, and combinations thereof.

In another embodiment the vulcanized rubber granulate comprises between 15% and 25% of EPDM granulate by weight.

In another embodiment the vulcanized rubber granulate comprises between 23% and 26% mineral oil by weight.

In another embodiment the vulcanized rubber granulate comprises between 50% to 55% of filler material by weight.

In another embodiment the natural fiber has a maximum length of 0.3 cm.

In another embodiment the natural fiber has a maximum length of 0.5 cm.

In another embodiment the natural fiber has a maximum length of 1 cm.

In another embodiment the vulcanized rubber granulate further comprises a polyethylene-based dye and a compatibilizer. This may be advantageous because it may be possible to give a more realistic appearance to the vulcanized rubber granulate.

The vulcanized rubber granulate further comprises any one of the following: a vulcanization catalyst and mercaptobenzothiazole. The use of either of these components in the vulcanized portion may increase the quality of the resulting artificial turf infill.

In another embodiment the rubber granulate has a diameter between any one of the following: 0.5 mm and 5 mm, 0.7 mm and 4.0 mm, and 0.8 mm and 3.0 mm.

In another embodiment the artificial turf comprises an artificial turf carpet.

In another embodiment the artificial turf further comprises a sprinkler system. The use of a sprinkler system with the artificial turf may be beneficial because it may be used to automatically wet the artificial turf infill. For example this may be a convenient means of watering the artificial turf during a half time so that the artificial turf can be kept cooler during game play.

In another embodiment the rubber granulate comprises at least one outer coating. The at least one outer coating comprises a binding agent. A binding agent as used herein may encompass any material which is used for gluing or attaching two objects to each other. At least a portion of the natural fiber is attached to the rubber granulate by the at least one outer coating. This may be beneficial because attaching the natural fiber to the surface of the rubber granulate may help prevent the natural fiber from sorting out or going to the top of the artificial turf infill. This may lead to more equal distribution of the natural fiber within the rubber granulate over an extended period of time.

In another embodiment the at least one outer coating further comprises at least one pigment.

In another embodiment the binding agent comprises at least one type of polyurethane polymer.

In another aspect the invention provides for a method of at least partially manufacturing an artificial turf. The method comprises mixing natural fiber and rubber granulate to provide artificial turf infill. The artificial turf infill comprises between 10% and 40% of the natural fiber by wt.

In another embodiment the method further comprises installing an artificial turf carpet on a surface. The artificial turf carpet comprises a pile. The method further comprises spreading the artificial turf infill within the pile.

In another aspect the invention provides for a method of at least partially manufacturing a turf infill for an artificial turf, wherein the method comprises mixing natural fiber and rubber granulate to provide artificial turf infill, wherein the artificial turf infill comprises between 10% and 40% of the natural fiber by weight. The turf infill can be (or comprise) an artificial turf infill.

In another embodiment, the natural fiber comprises any one of the following: hemp fiber, cotton fiber, burlap fiber, sisal fiber, elephant grass fiber, cellulose fiber, and combinations thereof.

In another embodiment, the method further comprises: providing an initial composition comprising the natural fiber and the rubber granulate, and a fluid binding agent comprising at least one type of polymer component; mixing the initial composition; adding water and a catalyst to the initial composition during the mixing of the initial composition to cure the fluid binding agent into an initial coating of the granulate; providing a subsequent composition comprising the natural fiber and the rubber granulate with the initial coating, and the fluid binding agent; mixing the subsequent composition; and adding water and the catalyst to the subsequent composition during the mixing of the subsequent composition to cure the fluid binding agent into a subsequent coating of the granulate.

In another embodiment the method further comprises providing an initial composition comprising the natural fiber and the rubber granulate. These may be pre-mixed or they may be mixed during this step. The initial composition further comprises a fluid binding agent. The method further comprises mixing the initial composition. This step may be used for providing the artificial turf infill.

In another embodiment the initial composition further comprises at least one first type of pigment. This may be beneficial in helping to give the artificial turf infill a realistic appearance.

In another embodiment the fluid binding agent comprises at least one type of polymer component. The method further comprises adding water and a catalyst to the initial composition during the mixing of the initial composition to cure a fluid binding agent and the at least one type of pigment into an initial coating of the granulate. The use of the polymer component may be beneficial because it may provide for a means of making the rubber granulate more attractive as well as attaching the natural fiber to the rubber granulate at the same time.

In another embodiment the method further comprises providing a subsequent composition comprising the natural fiber and the rubber granulate with the initial coating, at least one second type of pigment, and the fluid binding agent. The method further comprises mixing the subsequent composition. The method further comprises adding water and the catalyst to the subsequent composition during mixing of the subsequent composition to cure the fluid binding agent and the at least one type of pigment into a subsequent coating of the granulate. This may be beneficial because it may provide for further cementing the connection between the rubber granulate and the natural fiber.

The at least one second type of pigment and the at least one first type of pigment may be identical or they may be different. If they are the same then the coating of the granulate will be of a uniform color. If the at least one second type of pigment and the at least one first type of pigments are different colors then the two colors can be chosen so that the resulting artificial turf infill has a more natural and earth like appearance.

The method further comprises providing the granulate with the subsequent coating as artificial turf infill.

The coating of the granulate in at least two steps as described above, may be beneficial because it may provide for better coating of the granulate For example, during the mixing of the initial composition individual grains of the granulate will touch and interact with each other as the initial coating on each of the grains forms. The physical contact between different grains will however cause defects. By coating the granulate particles a second time with the subsequent coating, much higher coverage of the granulate can be achieved.

As a hypothetical example, during the formation of the initial coating or the subsequent coating the coverage is each only 90% of the surface of the granulate. After the initial coating has been deposited, roughly 10% of each granule of the granulate would be uncoated. There would be small surface defects. Deposition of the subsequent coating would then also cover 90% of the surface. As the interaction between the grains or particles of the granulate is essentially a random process, one can expect that 90% of the defects that were exposed after the deposition of the initial coating are coated in this case. The result of doing two coatings is then an artificial turf infill that is 99% coated with only minor amounts of defects, where the granulate is not coated with either the initial coating or the subsequent coating.

In another embodiment the rubber granulate comprises at least a first and a second outer coating. The first outer coating covers a portion of a surface of the rubber granulate and comprises a first binding agent. At least a portion of the natural fiber is attached to the rubber granulate by the first outer coatings. The second outer coating covers another portion of the surface of the rubber granulate and a portion of a surface of the first outer coating and comprises a second binging agent. At least another portion of the natural fiber is attached to the rubber granulate by the other one of the outer coatings. The first and the second binding agent can be different or the same.

Improving the coverage of the granulate may be beneficial in several different situations. For example, it may be desirable to color the artificial turf infill the same or a similar color as fibers or tufts, which are used to manufacture an artificial turf carpet. This may provide a more realistic-looking play surface or playfield. Another advantage is that the elastomeric granulate may be better coated and may therefore have superior wear qualities or may even be better isolated from the environment.

In another embodiment the natural fiber and the rubber granulate with the initial coating and the subsequent coating is recoated at least one time by performing the following sequence: providing a subsequent composition by adding at least one additive and the fluid binding agent to the granulate, mixing the subsequent composition and also adding water and the catalyst to the subsequent composition during the mixing of the subsequent composition to cure the fluid binding agent and the at least one additive into a further coating. The granulate with the further coating is provided as the artificial turf infill.

In another embodiment the at least one additive further comprises any one of the following: the at least one first type of pigment, the at least one second type of pigment, a flame retardant, aluminum trihydrate, magnesium hydroxide, an intumescent component, ammonium polyphosphate, exfoliated graphite, methylcellulose, zeolite, an antibacterial agent, silver, chitosan, an IR reflective pigment, a hindered amine light stabilizer, an anti-freeze additive, a de-icing additive, sodium chloride, potassium chloride, sodium formiate, potassium formiate, and combinations thereof.

In another embodiment the PU catalyst is partially or completely water soluble and is of the group: secondary amine, tertiary amine, a metal organo cytalyst In another embodiment the liquid PU component is based on an NCO terminal polymer which might be a pre-polymer, a polymeric isocyanate, an oligomeric isocyanate, a monomer and a mixture hereof.

In another embodiment the liquid PU component is based on an aromatic diisocyanate of the group toluene diisocyanate or methylene-2,2-diisocyanate, In another embodiment the liquid PU component is based on an aliphatic diisocyanate of the group hexamethylene diisocyanate, isophorone diisocyanate and 1,4-cyclohexyl-diisocyanate.

In preferred embodiment the liquid PU component is based on methylenediphenyl-isocyanate isomer mixture.

In another embodiment the hydroxyl component for the production of the PU is out of the group polyether polyol or polyester polyol.

In another embodiment the hydroxyl component is based on a polyetherpolyol of the molecular weight 500 to 10000. In a preferred embodiment the polyetherpolyol has a molecular weight of 1500-6000. In a very preferred embodiment the molecular weight is in the range of 2000-4000.

In another embodiment the at least one additive comprises the at least one first and/or second type of pigment.

In another embodiment the at least one additive further comprises a flame retardant like aluminum trihydrate, magnesium hydroxide turning a by itself burnable or flammable elastomeric material into a flame retardant infill material.

In another embodiment this flame retardant additives creates an intumescent coating and is based on intumescent component comprising ammonium polyphosphate or exfoliated graphite or a mixture hereof.

In another embodiment the at least one additive further comprises zeolite. The addition of zeolite may be beneficial because then the surface of the artificial turf infill may be able to absorb or de-absorb water. For example before a football game, which is scheduled to be held in the sun or in hot conditions, water may be sprayed onto the artificial turf and the zeolite may absorb an amount of water. As the sun or hot air heats the artificial turf infill during the game, the evaporation of water may cool the playing surface for the players and make the use of the artificial turf more pleasant.

In another embodiment the at least one additive further comprises methylcellulose, which may be beneficial in a similar way like zeolite for absorbing and desorbing of water, rendering a cooling effect at hot climatic conditions.

In another embodiment the at least one additive further comprises an antibacterial agent.

In another embodiment the at least one additive further comprises silver. Silver may be beneficial as an antibacterial agent.

In another embodiment the at least one additive further comprises chitosan, showing natural antibacterial properties.

In another embodiment the at least one additive further comprises an IR reflective pigment. The use of the IR reflective pigments as mixed metal oxides may be beneficial because it may reflect infrared light. This may reduce the heating of the artificial turf infill. A specific advantage may be that in this case the comparably expensive and precious pigments are merely on the surface of the infill granulates, where they are fully effective and not in the complete core of the elastic material In another embodiment the rubber granulate is a rubber granulate.

In another embodiment the rubber granulate comprises any one of the following: rubber, an elastomeric polymer, Metallocene Butadiene Rubber, nitrile rubber granulate, natural rubber granulate, styrene-butadiene rubber granulate, ethylene propylene diene monomer rubber granulate, black crumb rubber granulate, acrylonitrile butadiene rubber, a thermoplastic polymer, Styrene Ethylene Butylene Styrene, Styrene Block Copolymers, and combinations thereof.

In another embodiment the rubber granulate has an average diameter between 0.1 mm and 0.3 mm and/or wherein the granulate has a maximum diameter of less than 5 mm.

In another embodiment the polymer component is cured into at least one type of polyurethane by the water and the catalyst.

In another embodiment the fluid binding agent comprises a liquid polyurethane component.

In another embodiment the at least one first and/or second type of pigment comprises an inorganic pigment, an organic pigment or mixtures hereof.

In another embodiment the at least one first and/or second type of pigment comprises any one of the following: iron oxide, iron oxide hydroxide, chromium(III) oxide, a copper phythalocyanine pigment, a nickel azopigment, titanium oxide and combinations thereof.

In another embodiment the at least one type of additive is hindered amine light stabilizer (HALS) which is able to protect the PU coating as well as the elastic and/or compression resilient granulate against UV degradation.

In another embodiment the at least one type of additive is a thermostabilizing agent, protecting the elastic and/or compression resilient granulate against thermal degradation.

In another embodiment the at least one type of additive is an anti-freeze/deicing additive of the group: sodium chloride, potassium chloride, calcium chloride, sodium formiate, potassium formiate or a mixture hereof. The additive is migrating into the neighborhood of the granulate and by this inhibits the formation of ice by freezing humidity between the infill granulate particles.

In another embodiment the fluid binding agent further comprises any one of the following: a surfactant, a polyurethane aliphatic isocyanate, a polyurethane aromatic isocyanate, zeolite, an antibacterial agent, silver, IR reflective pigment, and combinations thereof.

In another embodiment the polymer component comprises any one of the following: at least one type of monomer, at least one type of partially polymerized polymer, and combinations thereof.

In another embodiment the polymer component is cured into at least one type of polyurethane by the water and the catalyst.

For example the polymer component could be methylene diphenyl diisocyanate. The polymer component could also comprise polyols.

In another embodiment the catalyst comprises any one of the following: an amine catalyst and a metal organic catalyst.

In another embodiment the method further comprises drying the subsequent composition before providing the granulate as the artificial turf infill.

It may also be possible to dry the initial composition after coating the granulate with the initial coating; however, it is not necessary. The water, which is leftover from the formation of the initial coating on the elastic and/or compression resilient granulate may be used in the reaction of the subsequent composition.

It is understood that one or more of the aforementioned embodiments of the invention may be combined as long as the combined embodiments are not mutually exclusive.

BRIEF DESCRIPTION OF THE DRAWINGS

In the following embodiments of the invention are explained in greater detail, by way of example only, making reference to the drawings in which.

DETAILED DESCRIPTION

Figure 1:
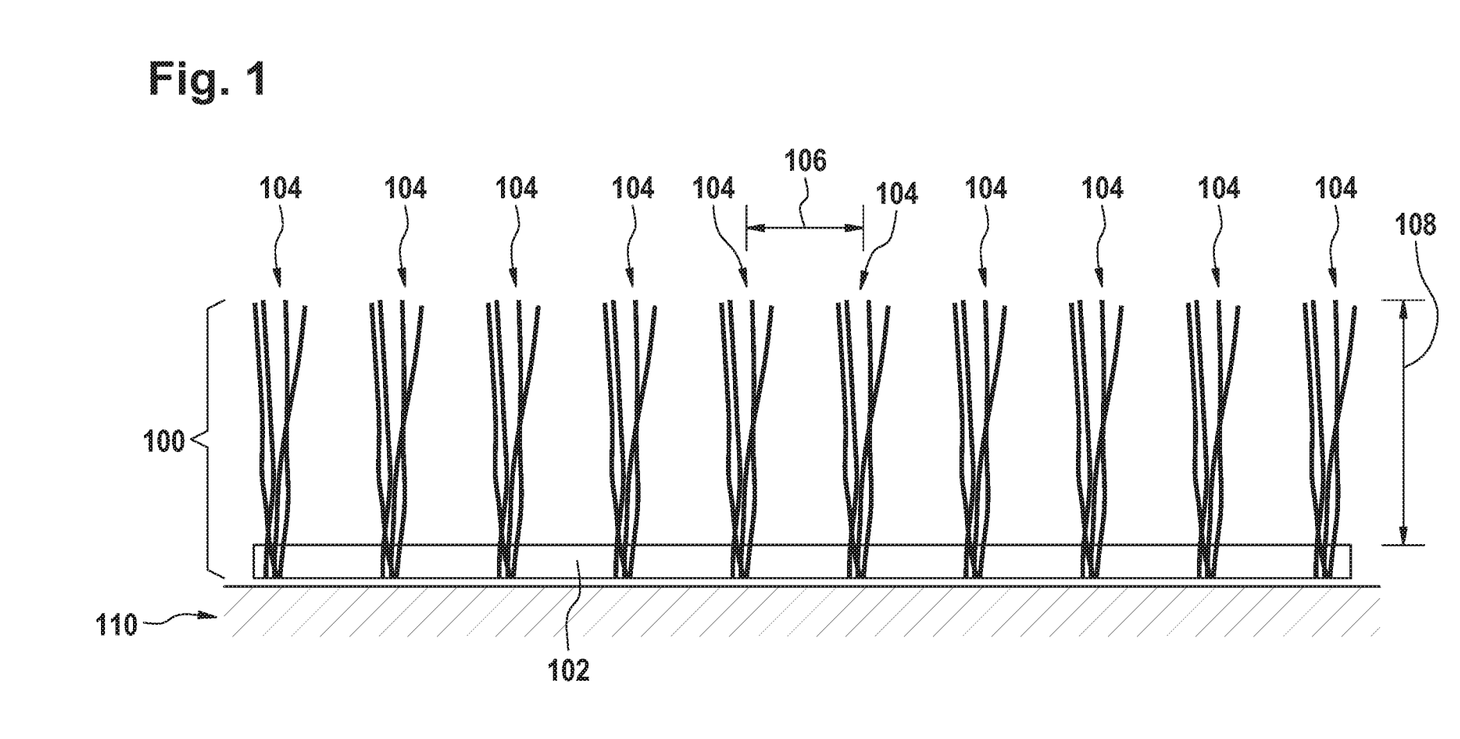
FIG. 1 illustrates an example of an artificial turf carpet.
Figure 2:
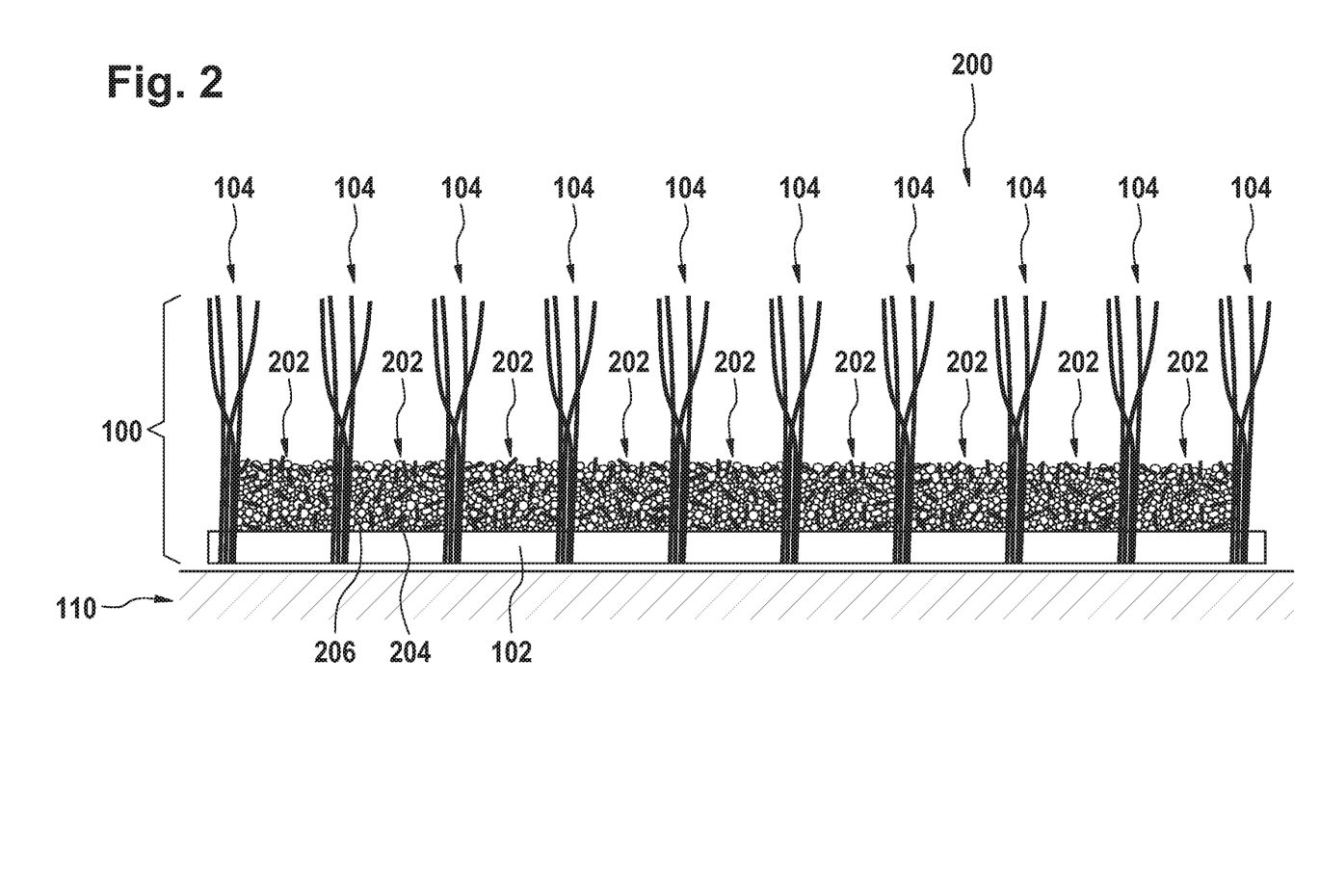
FIG. 2 illustrates an example of an artificial turf manufactured from the artificial turf carpet of FIG. 1.

Like numbered elements in these figures are either equivalent elements or perform the same function. Elements which have been discussed previously will not necessarily be discussed in later figures if the function is equivalent. FIGS. 1 and 2 illustrate the manufacture of an artificial turf using an artificial turf carpet and artificial turf infill. In FIG. 1 an artificial turf carpet 100 can be seen. The artificial turf carpet 100 comprises a backing 102. The artificial turf carpet 100 shown in FIG. 1 is a tufted artificial turf carpet in this example. The artificial turf carpet is formed by artificial turf fiber tufts 104 that are tufted into the backing 102. The artificial turf fiber tufts 104 are tufted in rows. There is row spacing 106 between adjacent rows of tufts. The artificial turf fiber tufts 104 also extent a distance above the backing 102. The distance that the fibers 104 extend above the backing 102 is the pile height 108. In FIG. 1 it can be seen that the artificial turf carpet 100 has been installed by placing or attaching it to the ground 110 or a floor.

FIG. 2 illustrates an artificial turf 200 manufactured from the artificial turf carpet 100 of FIG. 1. To manufacture the artificial turf 200 a infill 202 made up of a mixture of natural fibers 204 and rubber granulate 206 is spread out on the surface and distributed between the artificial turf fiber tufts 704. FIG. 2 shows the artificial turf carpet 200 after artificial turf infill 202 has been spread out and distributed between the artificial turf fiber tufts 704.

The artificial turf infill 202 can be seen as comprising natural fibers 204 and rubber granulate 206. In some examples the rubber granulate 206 and the natural fiber 204 are freely mixed. In other examples the natural fiber may be at least partially attached to the rubber granulate 206 by an adhesive or binding agent.

Figure 3:
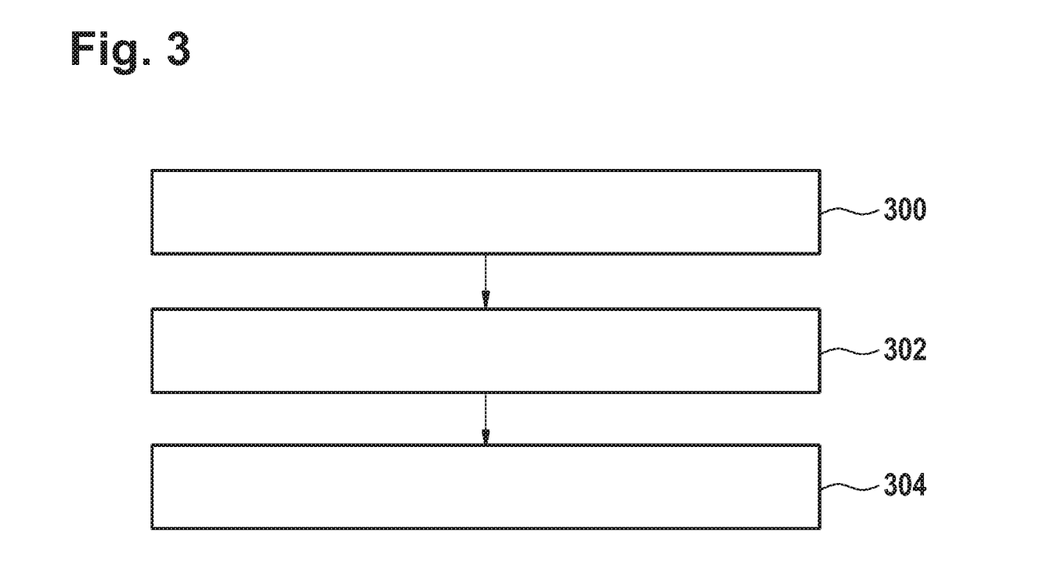
FIG. 3 shows a flow chart which illustrates a method of manufacturing an artificial turf.

FIG. 3 shows a flowchart which illustrates a method of manufacturing the artificial turf 200 shown in FIG. 2. First in step 300 natural fibers 204 are mixed with a rubber granulate 206. Next in step 302 an artificial turf carpet 100 is installed on a surface 110. The artificial turf carpet 100 comprises a pile 108. Then in step 304 the artificial turf 200 is formed by spreading the artificial turf infill 202 within the pile 108.

Figure 4:
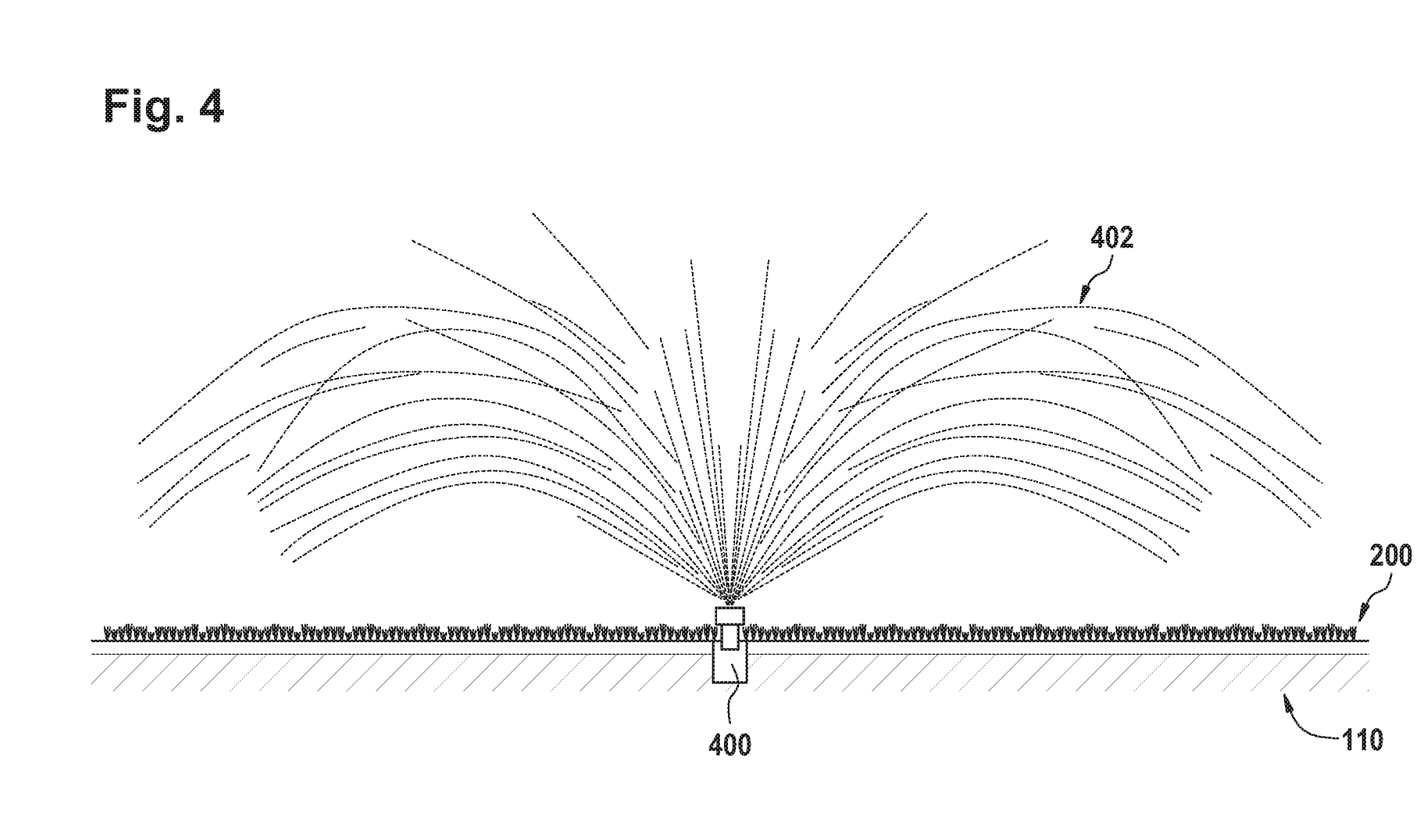
FIG. 4 illustrates an example of an artificial turf which incorporates a sprinkler system.

FIG. 4 shows a further example of the artificial turf 200. In this example an automatic sprinkler system 400 has been integrated into the artificial turf 200. The sprinkler 400 is depicted as spraying water 402 on an upper surface of the artificial turf 200. The use of an artificial sprinkler may be beneficial in combination with the infill component that comprises both the rubber granulate and the natural fiber. The natural fiber may absorb water which through evaporation can help to keep the surface of the artificial turf 200 cool.

Figure 5:
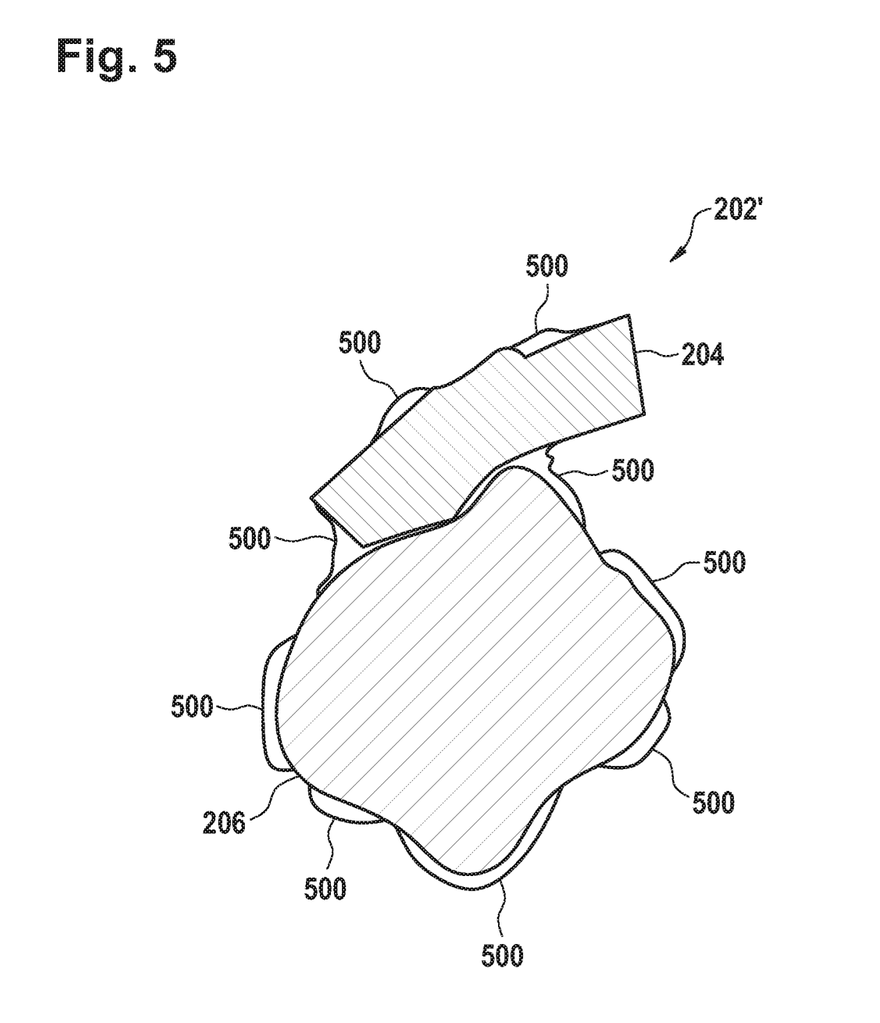
FIG. 5 illustrates an example of an artificial turf infill.

FIG. 5 illustrates a further example of artificial turf infill 202'. In this example there is a natural fiber 204 which is attached to the rubber granulate 206 by an outer coating 500. The outer coating 500 serves as a binding agent and may glue the natural fiber 204 to the rubber granulate 206. There may be various variations of the example illustrated in FIG. 5. For example in some cases the rubber granulate 206 could have one or more initial coatings before the outer coating 500 is applied. In other examples the natural fiber 204 may be firstly attached to the rubber granulate 206 and then additional coatings may be placed on both the combined natural fiber 204 and the rubber granulate 206. In some examples only a portion of the natural fibers 204 are bound to a rubber granulate 206.

Figure 6:
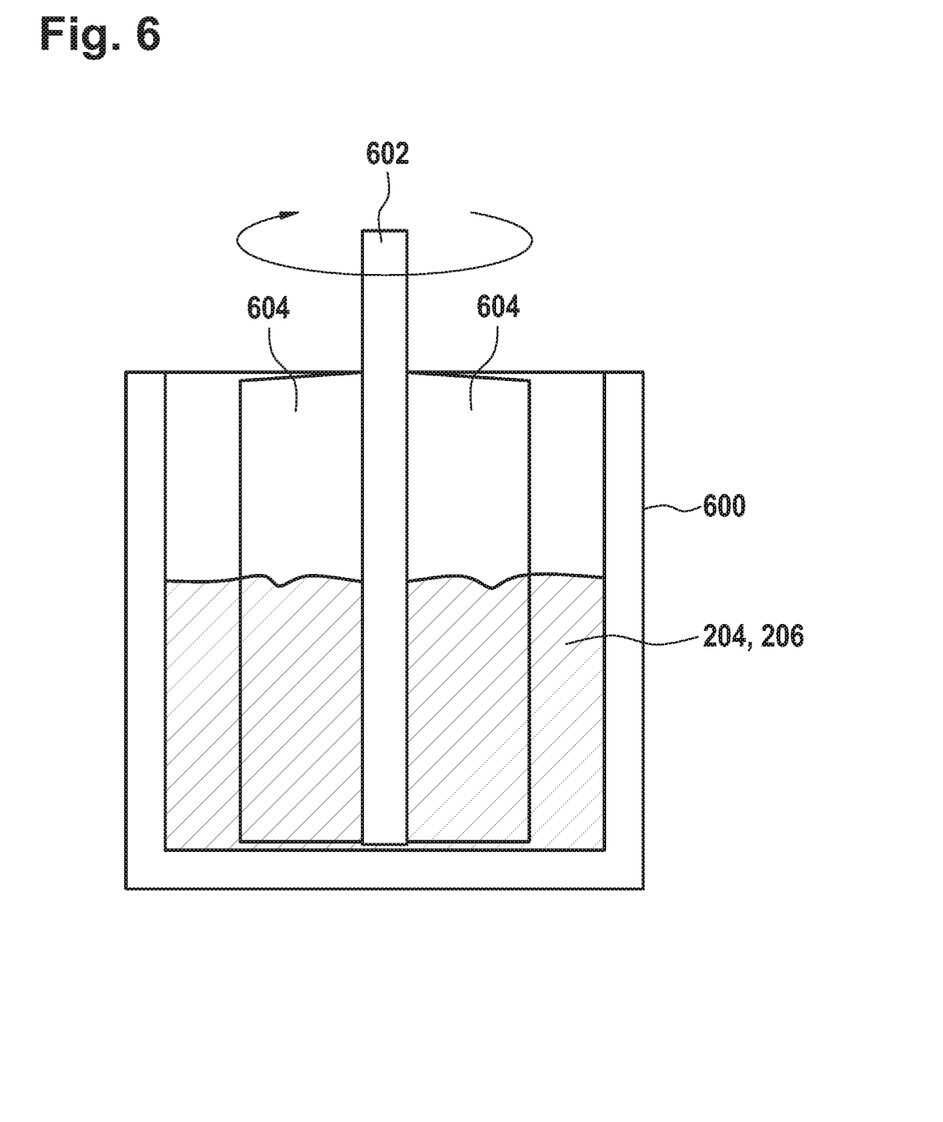
FIG. 6 illustrates an example of a mixing vat suitable for manufacturing the artificial turf infill of FIG. 5.

FIG. 6 illustrates some equipment which may be used for manufacturing the artificial turf infill 202' as depicted in FIG. 5. FIG. 6 depicts a mixing vat 600. The mixing vat has a rotatable shaft 602 that is connected to a number of mixing paddles 604. The mixing vat 600 is filled with rubber granulate 206 and natural fiber 204. The rubber granulate 206 and the natural fiber 204 can then be manufactured into artificial turf infill by forming an initial composition. The initial composition comprises the rubber granulate 206, the natural fiber, optionally at least one first type of pigment, and a fluid binding agent. The fluid binding agent, may for example, comprises at least one type of polymer component. Next in step the initial composition is mixed. During this step, the mixing water and catalyst are added to the initial composition to cure the fluid binding agent and the optional at least one type of pigment into an outer coating 500 that bonds at least some of the natural fibers 204 and rubber granulate 206 together.

The apparatus depicted in FIG. 6 may be used for manufacturing the artificial turf infill as batches. It is also possible to manufacture the artificial turf infill as a continuous process using a flow reactor.

Figure 7:
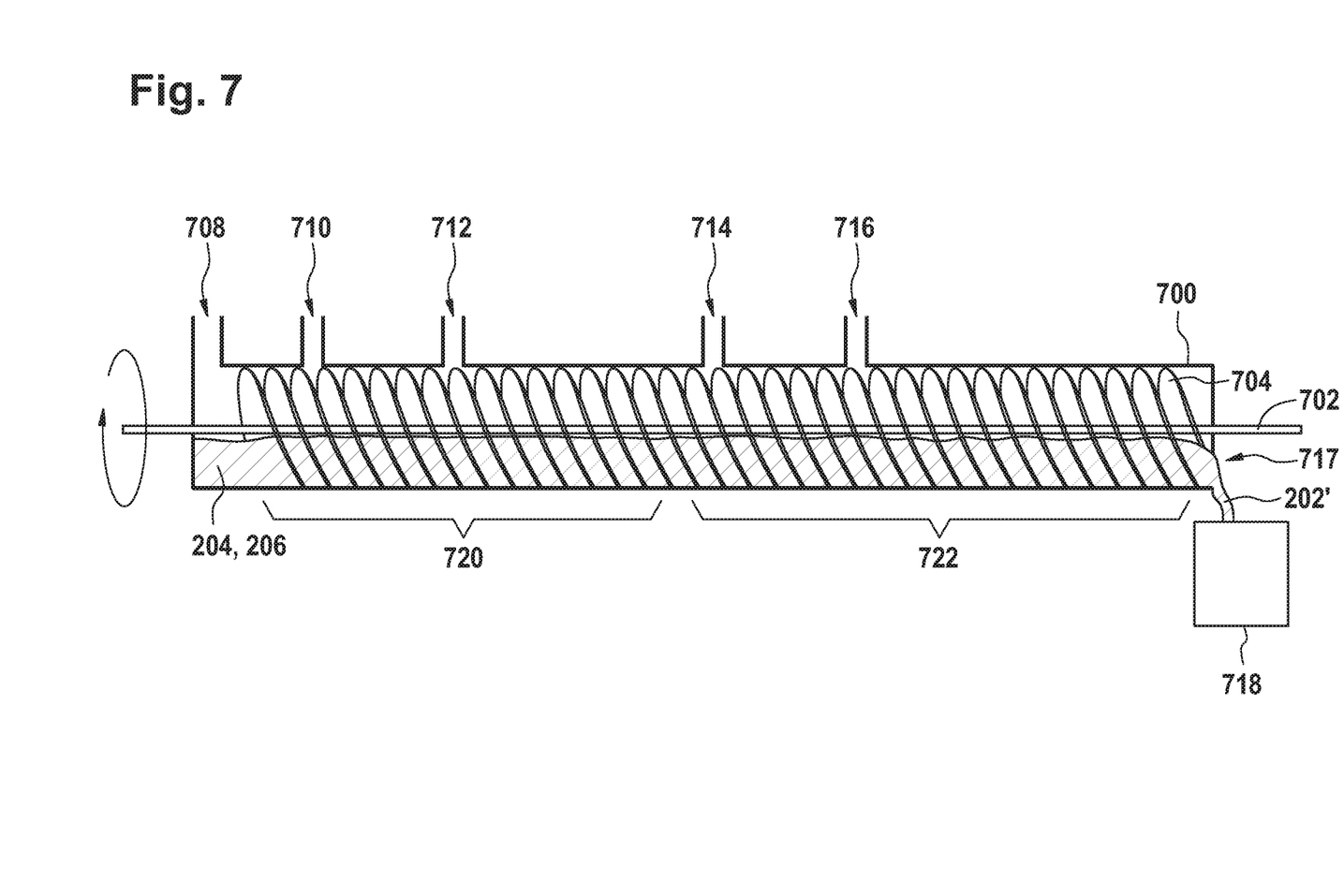
FIG. 7 illustrates an example of a flow reactor suitable for manufacturing the artificial turf infill of FIG. 5.

FIG. 7 illustrates an example of a flow reactor 700. The example shown in FIG. 7 is illustrative and is not drawn to scale. The flow reactor 700 comprises a rotatable shaft 702 that is connected to a screw conveyor 704. The screw conveyor 704 is similar to an Archimedes screw, which is mounted horizontally. The flow reactor 700 can be shown as being filled with rubber granulate 206 and natural fiber 204. As the rotatable shaft 702 is turned, it causes the natural fiber 204 and rubber granulate 206 to move through the flow reactor 700. It also causes the natural fiber 204 and the rubber granulate 206 to be mixed. At an entrance there is an inlet 708 for adding the rubber granulate 206 and the natural fiber 204. This may be done on a continual basis as the shaft 702 is rotated. This causes the natural fiber 204 and the rubber granulate 206 to go to a first inlet for adding fluid binding agent and, as option, at least one pigment. At inlet 710 the at least one pigment and the fluid binding agent are added to the natural fiber 204 and the rubber granulate 206 and become mixed with it as the shaft 702 is rotated. When they are thoroughly mixed, the natural fiber 204 and the rubber granulate 206 and the at least one pigment and the fluid binding agent form an initial composition 720. This initial composition 720 is then transported beneath a first inlet for water and catalyst 712. The water and catalyst may be added on a continual or intermittent basis at this inlet 712.

As the initial composition 720 is transported further along the flow reactor 700 fluid binding agent and at least one pigment cure into the outer coating 500 such as depicted in FIG. 5. Some of the natural fibers 204 become attached to the rubber granulate 206. At this point, the artificial turf infill has been formed.

In some examples the flow reactor may additional inlets so that additional layers or coatings can be applied. FIG. 7 also depicts optional inlets 714 and 716. After the outer coating 500 is formed, the initial composition 720 is transported underneath the second inlet 714 for adding fluid binding agent and, as option, at least one pigment. At this point more of the pigment and fluid binding agent are added and the initial composition 720 becomes the subsequent composition 722. The pigments used for the initial composition and the subsequent composition may be identical or they may be different.

The subsequent composition 722 is mixed and transported underneath the second inlet for water and catalyst 716. The water and catalyst are then mixed with the subsequent composition 722 and over time are further transported to the end of the flow reactor 700. By the time the subsequent composition 722 has reached the end of the flow reactor 700 the subsequent coating has formed on the rubber granulate 206 and or the natural fibers 204. At the very end, then the artificial turf infill 202' exits the flow reactor 700 at an outlet 717. The natural fiber 204 and the rubber granulate 206 at this point is then artificial turf infill 202'. The artificial turf infill 202' is then shown as entering into an optional dryer 718.

It is clear from FIG. 7 that the flow reactor may also be extended. For example if it is desired to put a third or fourth or even more coatings, the number of inlets in the flow reactor 700 can simply be increased. This may involve moving the granulate at a different rotational rate or possibly even making the flow reactor 700 longer.

LIST OF REFERENCE NUMERALS 100 artificial turf carpet
102 backing
104 artificial turf fiber tufts
106 row spacing
108 pile height
110 ground or floor
200 artificial turf
202 artificial turf infill
202' artificial turf infill
204 natural fiber
206 rubber granulate
300 mix natural fiber and rubber granulate
302 install an artificial turf carpet on a surface
304 spreading the artificial turf infill within the pile
400 sprinkler
402 water
500 outer coating
600 mixing vat
602 rotatable shaft
604 mixing paddles
700 flow reactor
702 rotatable shaft
704 screw conveyor
708 inlet for granulate
710 first inlet for at least one pigment and fluid binding agent
712 first inlet for water and catalyst
714 second inlet for at least one pigment and fluid binding agent
716 first inlet for water and catalyst
717 outlet
718 dryer
720 initial composition
722 subsequent composition

The invention claimed is:

1. An artificial turf comprising:
an artificial turf infill, the artificial turf infill including natural fiber mixed with rubber granulate, the artificial turf infill including between 10% and 40% of the natural fiber by weight, the natural fiber including hemp fiber, cotton fiber, sisal fiber, elephant grass fiber, or any combination thereof,
wherein the rubber granulate includes outer coatings,
wherein one of the outer coatings covers a portion of a surface of the rubber granulate and includes a first binding agent,
wherein at least a portion of the natural fiber is attached to the rubber granulate by the one of the outer coatings,
wherein another one of the outer coatings covers another portion of the surface of the rubber granulate and a portion of a surface of the one of the outer coatings and comprises a second binding agent,
wherein at least another portion of the natural fiber is attached to the rubber granulate by the other one of the outer coatings,
wherein the one of the outer coatings is a first outer coating, wherein another one of the outer coatings is a second outer coating, and wherein the rubber granulate comprises one or more further outer coatings, wherein each further outer coating of the one or more further outer coatings includes either the first or second binding agent, and wherein each further outer coating of the one or more further outer coatings does not include the natural fiber.

2. The artificial turf of claim 1, wherein the artificial turf infill consists of the natural fiber and the rubber granulate.

3. The artificial turf of claim 1, wherein the rubber granulate is a vulcanized rubber granulate.

4. The artificial turf of claim 3, wherein the vulcanized rubber granulate further comprise a filler material.

5. The artificial turf of claim 4, wherein the filler material comprises any one of the following: Kaolinite, chalk, and combinations thereof.

6. The artificial turf of claim 3, wherein the vulcanized rubber granulate comprises:
15% to 25% of a EPDM granulate by weight;
23% to 26% of a mineral oil by weight;
50% to 55% of a filler material by weight, or any combination thereof.

7. The artificial turf of claim 1, wherein the natural fiber has a maximum length selected from any one of the following: 0.3 cm, 0.5 cm, or 1 cm.

8. The artificial turf of claim 3, wherein the vulcanized rubber granulate further comprises a polyethylene based dye and a compatibilizer.

9. The artificial turf of claim 1, wherein the rubber granulate has a diameter between any one of the following: 0.5 mm and 5.0 mm; 0.7 mm and 4.0 mm; or 0.8 mm and 3.0 mm.

10. The artificial turf of claim 1, wherein the artificial turf comprises an artificial turf carpet.

11. The artificial turf of claim 1, wherein the artificial turf further comprises a sprinkler system.

12. The artificial turf of claim 1, wherein the artificial turf infill does not comprise coconut fibers.

13. The artificial turf of claim 3, wherein the vulcanized rubber granulate further comprises a vulcanization catalyst and mercaptobenzothiazole.

14. A method of at least partially manufacturing an artificial turf to provide artificial turf infill, wherein the artificial turf infill comprises between 10% and 40% of natural fiber by weight, wherein the natural fiber comprises any one of hemp fiber, cotton fiber, sisal fiber, elephant grass fiber, or any combination thereof, the method comprising:
providing an initial composition including the natural fiber and a rubber granulate, and a fluid binding agent including at least one type of polymer component;
mixing the initial composition;
adding water and a catalyst to the initial composition during the mixing of the initial composition to cure the fluid binding agent into an initial coating of the granulate;
providing a subsequent composition comprising the natural fiber and the rubber granulate with the initial coating, and the fluid binding agent;
mixing the subsequent composition;
adding water and the catalyst to the subsequent composition during the mixing of the subsequent composition to cure the fluid binding agent into a subsequent coating of the granulate; and
providing one or more further subsequent compositions, wherein for each further subsequent composition, providing at least one additive, the fluid binding agent and the rubber granulate with the subsequent coating, mixing the further subsequent composition, and adding water and the catalyst to the further subsequent composition during the mixing of the further subsequent composition to cure the fluid binding agent and the at least one additive into a further subsequent coating.

15. The method of claim 14, wherein the method further comprises:
installing an artificial turf carpet on a surface, wherein the artificial turf carpet comprises a pile; and
spreading the artificial turf infill within the pile.

16. The method of claim 14, wherein the initial composition further comprises a first type of pigment, and the mixing of the initial composition cures the fluid binding agent and the at least one type of pigment into the initial coating of the granulate.

17. The method of claim 16, wherein
providing the subsequent composition comprises providing the natural fiber and the rubber granulate with the initial coating, at least one second type of pigment, and the fluid binding agent, and
the mixing of the subsequent composition cures the fluid binding agent and the at least one second type of pigment into the subsequent coating of the granulate.

18. The method of claim 14, wherein the rubber granulate has an average diameter between 0.1 mm and 3.0 mm and/or wherein the rubber granulate has a maximum diameter less than 5.0 mm.

19. The method of claim 16, wherein the polymer component is cured into at least one type of polyurethane by the water and catalyst.

20. The method of claim 14, wherein the at least one type of polymer component comprises a liquid polyurethane component.

21. An artificial turf infill comprising:
natural fiber mixed with rubber granulate, the artificial turf infill including between 10% and 40% of the natural fiber by weight, the natural fiber including hemp fiber, cotton fiber, sisal fiber, elephant grass fiber, or any combination thereof,
wherein the rubber granulate includes outer coatings,
wherein one of the outer coatings covers a portion of a surface of the rubber granulate and includes a first binding agent, wherein at least a portion of the natural fiber is attached to the rubber granulate by the one of the outer coatings, wherein another one of the outer coatings covers another portion of the surface of the rubber granulate and a portion of a surface of the one of the outer coatings and comprises a second binding agent, wherein at least another portion of the natural fiber is attached to the rubber granulate by the other one of the outer coatings, wherein the one of the outer coatings is a first outer coating, wherein another one of the outer coatings is a second outer coating, and wherein the rubber granulate comprises one or more further outer coatings, wherein each further outer coating of the one or more further outer coatings includes either the first or second binding agent, and wherein each further outer coating of the one or more further outer coatings does not include the natural fiber.

22. A method of at least partially manufacturing an artificial turf infill for an artificial turf, wherein the artificial turf infill includes between 10% and 40% of natural fiber by weight, wherein the natural fiber comprises any one of hemp fiber, cotton fiber, sisal fiber, elephant grass fiber, or combinations thereof, comprising:

providing an initial composition including the natural fiber and a rubber granulate, and a fluid binding agent including at least one type of polymer component;

mixing the initial composition;

adding water and a catalyst to the initial composition during the mixing of the initial composition to cure the fluid binding agent into an initial coating of the granulate;

providing a subsequent composition including the natural fiber and the rubber granulate with the initial coating, and the fluid binding agent;

mixing the subsequent composition;

adding water and the catalyst to the subsequent composition during the mixing of the subsequent composition to cure the fluid binding agent into a subsequent coating of the granulate; and providing one or more further subsequent compositions, wherein for each further subsequent composition, providing at least one additive, the fluid binding agent and the rubber granulate with the subsequent coating, mixing the further subsequent composition, and adding water and the catalyst to the further subsequent composition during the mixing of the further subsequent composition to cure the fluid binding agent and the at least one additive into a further subsequent coating.

* * * * *